(12) United States Patent
Lee et al.

(10) Patent No.: US 12,462,453 B2
(45) Date of Patent: Nov. 4, 2025

(54) CONTEXT-AWARE SYNTHESIS AND PLACEMENT OF OBJECT INSTANCES

(71) Applicant: NVIDIA Corporation, Santa Clara, CA (US)

(72) Inventors: Donghoon Lee, Sunnyvale, CA (US); Sifei Liu, Santa Clara, CA (US); Jinwei Gu, San Jose, CA (US); Ming-Yu Liu, San Jose, CA (US); Jan Kautz, Lexington, MA (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 17/585,449

(22) Filed: Jan. 26, 2022

(65) Prior Publication Data

US 2022/0335672 A1    Oct. 20, 2022

Related U.S. Application Data

(63) Continuation of application No. 16/201,934, filed on Nov. 27, 2018, now abandoned.

(Continued)

(51) Int. Cl.
*G06T 3/02* (2024.01)
*G06F 18/21* (2023.01)
(Continued)

(52) U.S. Cl.
CPC ............ *G06T 11/60* (2013.01); *G06F 18/217* (2023.01); *G06F 18/24* (2023.01); *G06T 3/02* (2024.01);
(Continued)

(58) Field of Classification Search
CPC ... G06T 1/20; G06T 7/30; G06T 2207/20081; G06T 2207/20084; G09G 2340/06
(Continued)

(56) References Cited

U.S. PATENT DOCUMENTS 10,475,174 B2 *   11/2019   Lim ...................... G06T 7/0004
2013/0147798 A1   6/2013   Karsch et al.
(Continued)

FOREIGN PATENT DOCUMENTS

CN    102902807 A    1/2013
CN    107330954 A    11/2017

OTHER PUBLICATIONS

Bar et al., "Spatial context in recognition", Perception, vol. 25, No. 3, 1996, pp. 343-352.
(Continued)

*Primary Examiner* — Samantha (Yuehan) Wang
(74) *Attorney, Agent, or Firm* — Davis Wright Tremaine LLP

(57) ABSTRACT

One embodiment of a method includes applying a first generator model to a semantic representation of an image to generate an affine transformation, where the affine transformation represents a bounding box associated with at least one region within the image. The method further includes applying a second generator model to the affine transformation and the semantic representation to generate a shape of an object. The method further includes inserting the object into the image based on the bounding box and the shape.

30 Claims, 7 Drawing Sheets

Related U.S. Application Data

(60) Provisional application No. 62/726,872, filed on Sep. 4, 2018.

(51) Int. Cl.
*G06F 18/24* (2023.01)
*G06T 7/30* (2017.01)
*G06T 11/60* (2006.01)
*G06V 30/262* (2022.01)
*G06T 7/70* (2017.01)

(52) U.S. Cl.
CPC .............. *G06T 7/30* (2017.01); *G06V 30/274* (2022.01); *G06T 7/70* (2017.01); *G06T 2207/20081* (2013.01); *G06T 2207/20084* (2013.01); *G06T 2210/12* (2013.01)

(58) Field of Classification Search
USPC ........................................................ 345/629
See application file for complete search history.

(56) References Cited

U.S. PATENT DOCUMENTS

| | | | |
|---|---|---|---|
| 2014/0132786 | A1 | 5/2014 | Saitwal et al. |
| 2014/0270350 | A1* | 9/2014 | Rodriguez-Serrano ..................... G06F 18/21 382/103 |
| 2015/0116349 | A1 | 4/2015 | Hamada et al. |
| 2015/0130789 | A1 | 5/2015 | Heinz, II et al. |
| 2017/0243352 | A1 | 8/2017 | Kutliroff et al. |
| 2017/0330059 | A1 | 11/2017 | Novotny et al. |
| 2019/0163339 | A1* | 5/2019 | Zhu .................. G06F 3/0486 |
| 2019/0188524 | A1* | 6/2019 | He ..................... G06F 18/28 |
| 2019/0197358 | A1* | 6/2019 | Madani ................. G06N 3/045 |
| 2020/0035016 | A1* | 1/2020 | Muller .................... G06T 15/06 |
| 2021/0209339 | A1* | 7/2021 | You ..................... G06V 10/454 |
| 2021/0216878 | A1 | 7/2021 | Norman et al. |

OTHER PUBLICATIONS

Bousmalis et al., "Unsupervised Pixel-Level Domain Adaptation with Generative Adversarial Networks", In IEEE Conference on Computer Vision and Pattern Recognition, arXiv:1612.05424v2 [cs.CV] Aug. 23, 2017, 2017, pp. 1-15.

Cordts et al., "The Cityscapes Dataset for Semantic Urban Scene Understanding", In IEEE Conference on ComputerVision and Pattern Recognition, arXiv:1604.01685v2 [cs.CV] Apr. 7, 2016, 2016, 29 pages.

Diwala et al., "An Empirical Study of Context in Object Detection", In IEEE Conference on Computer Vision and Pattern Recognition, 2009, pp. 1271-1278.

Goodfellow et al., "Generative Adversarial Nets", In Neural Information Processing Systems, 2014, pp. 1-9.

Hong et al., "Inferring Semantic Layout for Hierarchical Text-to-Image Synthesis", In IEEE Conference on Computer Vision and Pattern Recognition, arXiv:1801.05091v2 [cs.CV] Jul. 26, 2018, 2018, pp. 1-15.

Huang et al., "Multimodal Unsupervised Image-to-Image Translation", In European Conference on Computer Vision, arXiv:1804.04732v2 [cs.CV] Aug. 14, 2018, 2018, pp. 1-23.

IEEE, "IEEE Standard 754-2008 (Revision of IEEE Standard 754-1985): IEEE Standard for Floating-Point Arithmetic," Aug. 29, 2008, 70 pages.

Isola et al., "Image-to-Image Translation with Conditional Adversarial Networks", arXiv:1611.07004v3 [cs.CV] Nov. 26, 2018, In IEEE Conference on Computer Vision and Pattern Recognition, 2017, pp. 1-17.

Jaderberg et al., "Spatial Transformer Networks", arXiv: 1506.02025v3 [cs.CV] Feb. 4, 2016, In Neural Information Processing Systems, 2015, pp. 1-15.

Karras et al., "Progressive Growing of Gans for Improved Quality, Stability, and Variation", In International Conference on Learning Representations, 2018, pp. 1-26.

Kingma et al., "Auto-Encoding Variational Bayes", arXiv:1312.6114v10 [stat.ML] May 1, 2014, 2013, pp. 1-14.

Larsen et al., "Autoencoding beyond pixels using a learned similarity metric", In International Conference on Machine Learning, arXiv:1512.09300v2 [cs.LG] Feb. 10, 2016, 2016, 8 pages.

Li et al., "Generative Face Completion", In IEEE Conference on Computer Vision and Pattern Recognition, arXiv:1704.05838v1 [cs.CV] Apr. 19, 2017, 2017, pp. 1-9.

Lin et al., "ST-GAN: Spatial Transformer Generative Adversarial Networks for Image Compositing", In IEEE Conference on Computer Vision and Pattern Recognition, arXiv:1803.01837v1 [cs.CV] Mar. 5, 2018, 2018, pp. 1-13.

Liu et al., "Coupled Generative Adversarial Networks", In Neural Information Processing Systems, arXiv:1606.07536v2 [cs.CV] Sep. 20, 2016, 2016, pp. 1-32.

Liu et al., "Unsupervised Image-to-Image Translation Networks", In Neural Information Processing Systems, arXiv:1703.00848v6 [cs.CV] Jul. 23, 2018, 2017, pp. 1-11.

Ouyang et al., "Pedestrian-Synthesis-GAN: Generating Pedestrian Data in Real Scene and Beyond" arXiv:1804.02047v2 [cs.CV] Apr. 14, 2018, 2018, pp. 1-22.

Pathak et al., "Context Encoders: Feature Learning by Inpainting", In IEEE Conference on Computer Vision and Pattern Recognition, arXiv:1604.07379v2 [cs.CV] Nov. 21, 2016, 2016, pp. 1-12.

Qi et al., "Semi-parametric Image Synthesis", In IEEE Conference on Computer Vision and Pattern Recognition, arXiv:1804.10992v1 [cs.CV] Apr. 29, 2018, 2018, pp. 1-9.

Radford et al., "Unsupervised Representation Learning With Deep Convolutional Generative Adversarial Networks", arXiv:1511.06434v2 [cs.LG] Jan. 7, 2016, 2015, pp. 1-16.

Redmon et al., "YOLOv3: An Incremental Improvement", arXiv:1804.02767v1 [cs.CV] Apr. 8, 2018, 2018, pp. 1-6.

Reed et al., "Learning What and Where to Draw", In Neural Information Processing Systems, arXiv:1610.02454v1 [cs.CV] Oct. 8, 2016, 2016, pp. 1-9.

Rezende et al., "Stochastic Backpropagation and Approximate Inference in Deep Generative Models" arXiv:1401.4082v3 [slat.ML] May 30, 2014, 2014, 14 pages.

Shrivastava et al., "Learning from Simulated and Unsupervised Images through Adversarial Training", In IEEE Conference on Computer Vision and Pattern Recognition, arXiv:1612.07828v2 [cs.CV] Jul. 19, 2017, 2017, 16 pages.

Sun et al., "Seeing Whal Is Nol There: Learning Context to Determine Where Objects Are Missing", In IEEE Conference on Computer Vision and Pattern Recognition, arXiv:1702.07971v1 [cs.CV] Feb. 26, 2017, 2017, pp. 1-10.

Taigman et al., "Unsupervised Cross-Domain Image Generation", In International Conference on Learning Representations, arXiv:1611.02200v1 [cs.CV] Nov. 7, 2016, 2017, pp. 1-14.

Tan et al., "Where and Who? Automatic Semantic-Aware Person Composition", In IEEE Winter Conference on Applications of Computer Vision, 2018, 10 pages.

Tobin et al., "Domain Randomization for Transferring Deep Neural Networks from Simulation to the Real World", In IEEE/RSJ International Conference on Intelligent Robots and Systems, arXiv:1703.06907v1 [cs.RO] Mar. 20, 2017, 2017, 8 pages.

Torralba, Antonio, "Contextual Priming for Object Detection", International Journal of Computer Vision, vol. 53, No. 2, Jan. 15, 2003, pp. 169-191.

Wang et al., "BingeWalching: Scaling Affordance Learning from Sitcoms", In IEEE Conference on Computer Vision and Pattern Recognition, 2017, 14 pages.

Wang et al., "High-Resolution Image Synthesis and Semantic Manipulation with Conditional GANs", In IEEE Conference on Computer Vision and Pattern Recognition, arXiv:1711.11585v2 [cs.CV] Aug. 20, 2018, 2018, pp. 1-14.

Wang et al., "Video-to-Video Synthesis", In Neural Information Processing Systems, arXiv: 1808.06601v2 [cs.CV] Dec. 3, 2018, 2018, pp. 1-14.

(56) References Cited

OTHER PUBLICATIONS

Zhang et al., "SlackGAN: Text to Photo-realistic Image Synthesis with Stacked Generative Adversarial Networks", In IEEE International Conference on Computer Vision, arXiv:1612.03242v2 [cs.CV] Aug. 5, 2017, 2017, pp. 1-14.
Zhu et al., "Toward Multimodal Image-to-Image Translation", In Neural Information Processing Systems, arXiv:1711.11586v4 [cs.CV] Oct. 24, 2018, 2017, pp. 1-12.
Zhu et al., "Unpaired Image-to-Image Translation using Cycle-Consistent Adversarial Networks", In IEEE International Conference on Computer Vision, 2017, pp. 2223-2232.
Office Action for Chinese Application No. 201910826859.0, mailed Dec. 8, 2023, 16 pages.
Office Action for Chinese Application No. 201910826859.0, mailed Jun. 27, 2024, 9 pages.
Office Action for Chinese Application No. 201910826859.0, mailed Dec. 18, 2024, 9 pages.
Notice of Decision to Grant for Chinese Application No. 201910826859.0, mailed Apr. 23, 2025, 9 pages.

* cited by examiner

CONTEXT-AWARE SYNTHESIS AND PLACEMENT OF OBJECT INSTANCES

CROSS-REFERENCE TO RELATED APPLICATIONS

This application is a continuation of U.S. application Ser. No. 16/201,934, filed on Nov. 27, 2018, entitled "CONTEXT-AWARE SYNTHESIS AND PLACEMENT OF OBJECT INSTANCES," which claims priority benefit of U.S. Provisional Patent Application No. 62/726,872, entitled, "CONTEXT-AWARE SYNTHESIS AND PLACEMENT OF OBJECT INSTANCES," filed on Sep. 4, 2018. The subject matter of these related applications are hereby incorporated herein by reference.

BACKGROUND

Objects can be inserted into scenes in real-world applications that include, but are not limited to, image synthesis, augmented reality, virtual reality, and/or domain randomization in machine learning. For example, machine learning models may insert pedestrians and/or cars into images containing roads for subsequent use in training an autonomous driving system and/or generating a video game or virtual reality environment. Inserting objects into a scene in a realistic and/or contextually meaningful way presents many technical challenges.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

In the following description, numerous specific details are set forth to provide a more thorough understanding of the various embodiments. However, it will be apparent to one of skilled in the art that the inventive concepts may be practiced without one or more of these specific details.

System Overview

Figure 1:
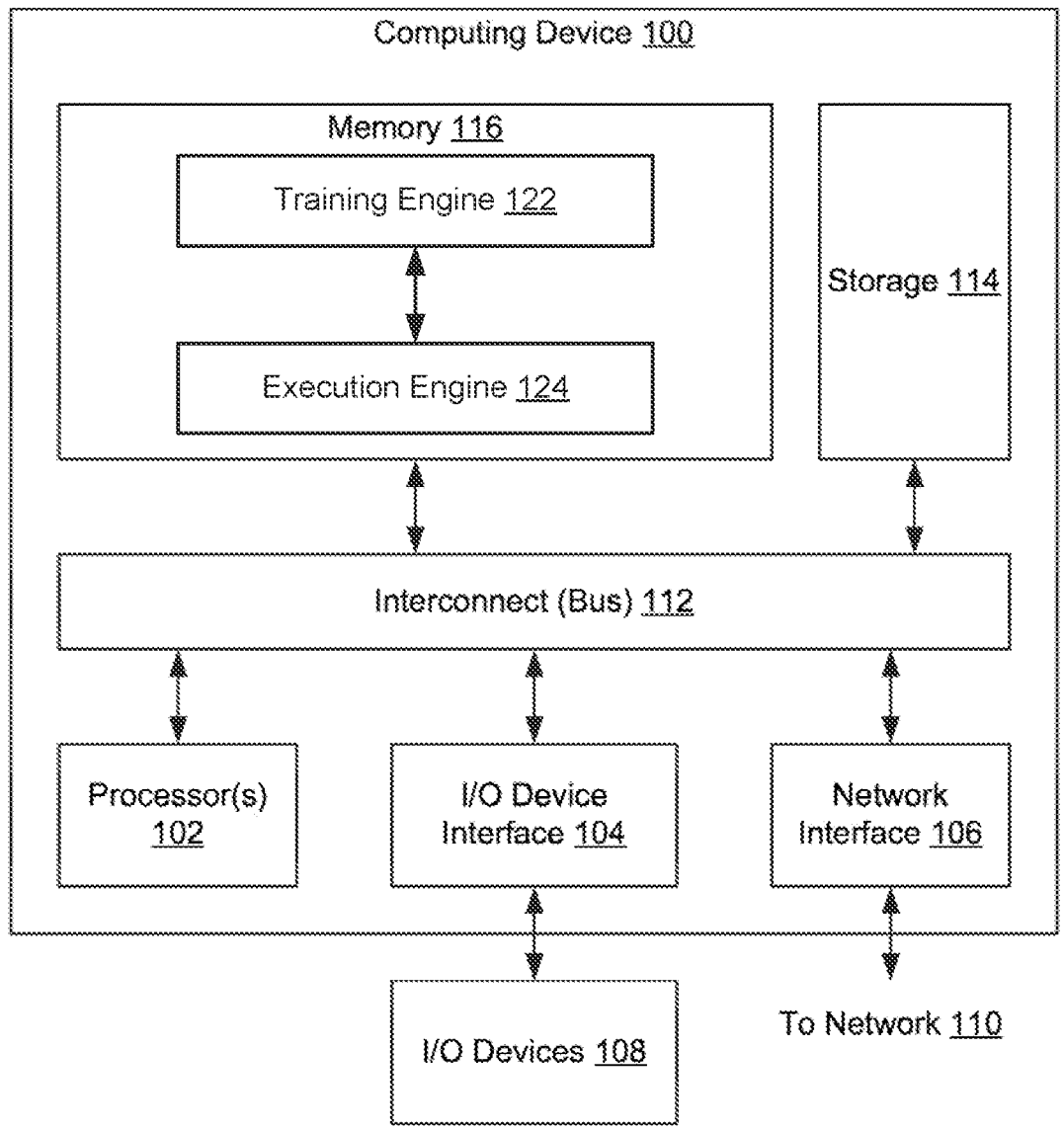
FIG. 1 is a block diagram illustrating a system configured to implement one or more aspects of various embodiments.

FIG. 1 illustrates a computing device 100 configured to implement one or more aspects of various embodiments. In one embodiment, computing device 100 may be a desktop computer, a laptop computer, a smart phone, a personal digital assistant (PDA), tablet computer, or any other type of computing device configured to receive input, process data, and optionally display images, and is suitable for practicing one or more embodiments. Computing device 100 is configured to run a training engine 122 and execution engine 124 that reside in a memory 116. It is noted that the computing device described herein is illustrative and that any other technically feasible configurations fall within the scope of the present disclosure.

In one embodiment, computing device 100 includes, without limitation, an interconnect (bus) 112 that connects one or more processing units 102, an input/output (I/O) device interface 104 coupled to one or more input/output (I/O) devices 108, memory 116, a storage 114, and a network interface 106. Processing unit(s) 102 may be any suitable processor implemented as a central processing unit (CPU), a graphics processing unit (GPU), an application-specific integrated circuit (ASIC), a field programmable gate array (FPGA), an artificial intelligence (AI) accelerator, any other type of processing unit, or a combination of different processing units, such as a CPU configured to operate in conjunction with a GPU. In general, processing unit(s) 102 may be any technically feasible hardware unit capable of processing data and/or executing software applications. Further, in the context of this disclosure, the computing elements shown in computing device 100 may correspond to a physical computing system (e.g., a system in a data center) or may be a virtual computing instance executing within a computing cloud.

In one embodiment, I/O devices 108 include devices capable of providing input, such as a keyboard, a mouse, a touch-sensitive screen, and so forth, as well as devices capable of providing output, such as a display device. Additionally, I/O devices 108 may include devices capable of both receiving input and providing output, such as a touchscreen, a universal serial bus (USB) port, and so forth. I/O devices 108 may be configured to receive various types of input from an end-user (e.g., a designer) of computing device 100, and to also provide various types of output to the end-user of computing device 100, such as displayed digital images or digital videos or text. In some embodiments, one or more of I/O devices 108 are configured to couple computing device 100 to a network 110.

In one embodiment, network 110 is any technically feasible type of communications network that allows data to be exchanged between computing device 100 and external entities or devices, such as a web server or another networked computing device. For example, network 110 may include a wide area network (WAN), a local area network (LAN), a wireless (WiFi) network, and/or the Internet, among others.

In one embodiment, storage 114 includes non-volatile storage for applications and data, and may include fixed or removable disk drives, flash memory devices, and CD-ROM, DVD-ROM, Blu-Ray, HD-DVD, or other magnetic, optical, or solid state storage devices. Training engine 122 and execution engine 124 may be stored in storage 114 and loaded into memory 116 when executed.

In one embodiment, memory 116 includes a random access memory (RAM) module, a flash memory unit, or any other type of memory unit or combination thereof. Processing unit(s) 102, I/O device interface 104, and network interface 106 are configured to read data from and write data to memory 116. Memory 116 includes various software programs that can be executed by processor(s) 102 and application data associated with said software programs, including training engine 122 and execution engine 124.

In one embodiment, training engine 122 generates machine learning models for inserting objects into scenes. The scenes may include semantic representations of images, such as segmentation maps that associate individual pixels in the images with semantic labels. For example, a segmentation map of an outdoor scene may include regions of pixels that are assigned to labels such as "road," "sky," "building," "bridge," "tree," "ground," "car," and "pedestrian." In turn, machine learning models created by training engine 122 may be used to identify plausible locations of an object in the scene, as well as a plausible sizes and shapes of the objects at the locations. In various embodiments, the machine learning models may learn "where" in a scene objects can be inserted, as well as "what" the objects look like, such that the object maintains contextual coherence with the scene.

In one embodiment, execution engine 124 executes the machine learning models to perform joint synthesis and placement of objects into scenes. Joint synthesis and placement of objects into scenes may involve combined learning of the location and scale of each object in a given scene, as well as the shapes of each object given the corresponding location and scale. Continuing with the above example, execution engine 124 may apply a first generator model generated by training engine 122 to a semantic representation of the outdoor scene to identify plausible locations in the scene into which cars, pedestrians, and/or other types of objects can be inserted. Execution engine 124 may then apply a second generator model created by training engine 122 to the semantic representation and locations identified by the first generator model to generate realistic shapes of the objects at the identified locations. Training engine 122 and execution engine 124 are described in further detail below with respect to FIG. 2.

Joint Synthesis and Placement of Objects in Scenes

Figure 2:
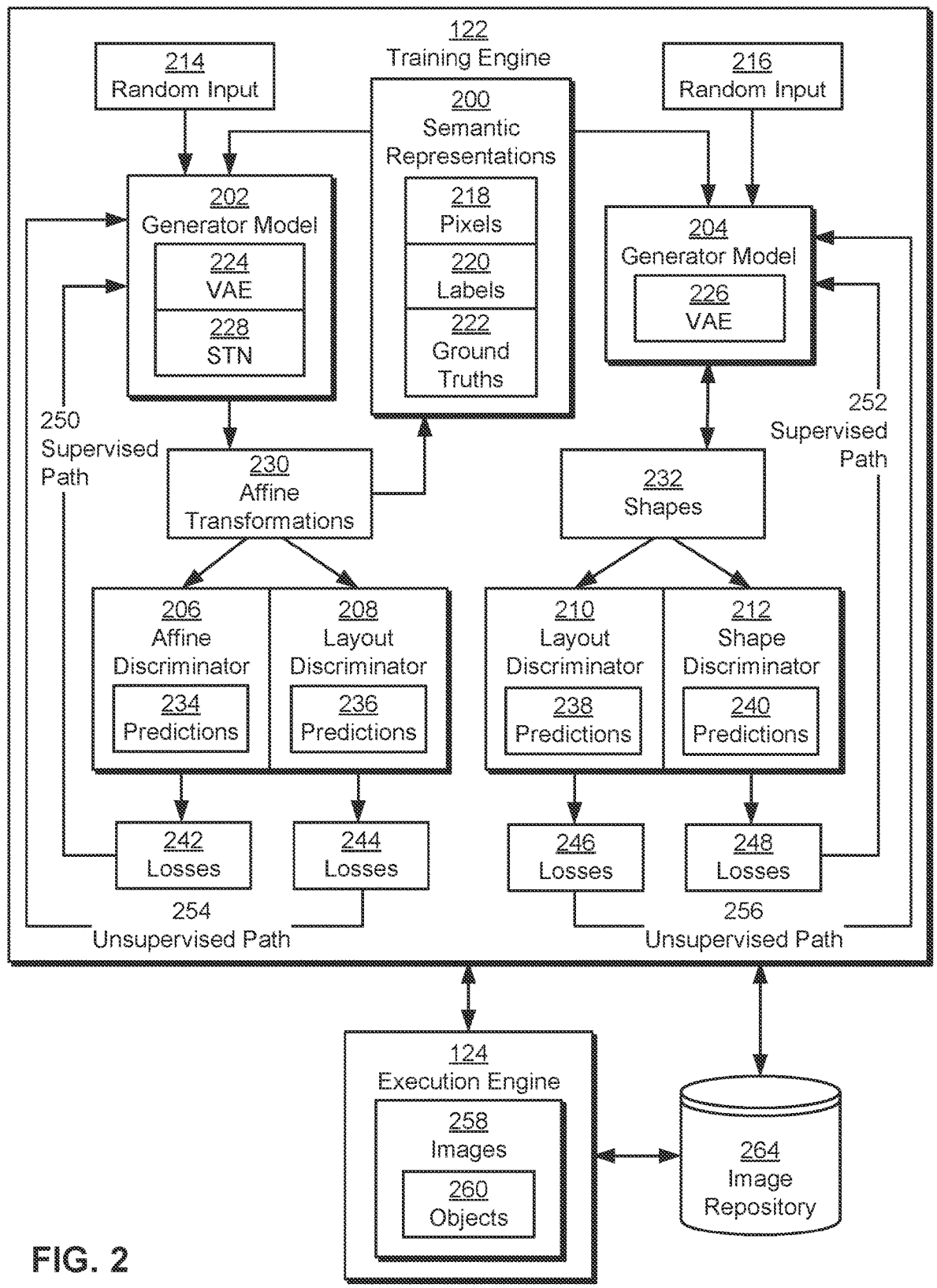
FIG. 2 is a more detailed illustration of the training engine and execution engine of FIG. 1, according to various embodiments.

FIG. 2 is a more detailed illustration of training engine 122 and execution engine 124 of FIG. 1, according to various embodiments. In the embodiment shown, training engine 122 creates a number of generator models, such as generator models 202-204, and a number of discriminator models, such as affine discriminator 206, layout discriminators 208-210, and shape discriminator 212, to perform joint synthesis and placement of objects based on semantic representations 200 of images 258. The discriminator models are collectively referred to herein as "discriminator models 206-212." In various embodiments, execution engine 124 applies generator models 202-204 to additional images 258 from an image repository 264 to insert objects 260 into images 258 in a realistic and/or semantically plausible way.

Generator models 202-204 and/or the corresponding discriminator models 206-212 can be any technically feasible form of machine learning model. For example, generator models 202-204, affine discriminator 206, layout discriminators 208-210, and/or shape discriminator 212 may include recurrent neural networks (RNNs), convolutional neural networks (CNNs), deep neural networks (DNNs), deep convolutional networks (DCNs), deep belief networks (DBNs), restricted Boltzmann machines (RBMs), long-short-term memory (LSTM) units, gated recurrent units (GRUs), generative adversarial networks (GANs), self-organizing maps (SOMs), and/or other types of artificial neural networks or components of artificial neural networks. In another example, generator models 202-204, affine discriminator 206, layout discriminators 208-210, and/or shape discriminator 212 may include functionality to perform clustering, principal component analysis (PCA), latent semantic analysis (LSA), Word2vec, and/or another unsupervised learning technique. In a third example, generator models 202-204, affine discriminator 206, layout discriminators 208-210, and/or shape discriminator 212 may include regression models, support vector machines, decision trees, random forests, gradient boosted trees, naïve Bayes classifiers, Bayesian networks, hierarchical models, and/or ensemble models.

As mentioned above, semantic representations 200 of images 200 may include pixels 218 in images 200, as well as labels 220 that associate pixels 218 with different classes. For example, a semantic representation of an outdoor scene may include a "segmentation map" containing regions of pixels 218 that are mapped to labels 220 such as "sky," "ground," "tree," "water," "road," "sidewalk," "building," "structure," "car," and/or "pedestrian." In various embodiments, each region of pixels 218 is mapped to one or more labels from labels 220.

In one embodiment, training engine 122 inputs semantic representations 200 of scenes into generator model 202. Generator model 202 outputs affine transformations 230 representing bounding boxes for objects 260 that can be inserted into the scenes. For example, training engine 122 may input a segmentation map of an outdoor scene into generator model 202, and generator model 202 may define a bounding box for a car, pedestrian, and/or another object to be inserted into the outdoor scene as an affine transformation matrix that is applied to a unit bounding box in the scene.

In various embodiments, the affine transformation matrix may include translation, scaling, rotation, and/or other types of affine transformations that are applied to the unit bounding box to produce a bounding box at a certain location and scale within the scene. In these embodiments, given a two-dimensional (2D) semantic representation of a scene with and a unit bounding box of 1 pixel by 1 pixel, the bounding box may be calculated using the following equation:

$$\begin{bmatrix} x' \\ y' \\ 1 \end{bmatrix} = \begin{bmatrix} a & b & t_x \\ c & d & t_y \\ 0 & 0 & 1 \end{bmatrix} \begin{bmatrix} x \\ y \\ 1 \end{bmatrix}$$

In the above equation, x and y represent the coordinates of each point in the unit bounding box, x' and y' represent the coordinates of a corresponding point in the bounding box identified by generator model 202 within the scene, and a, b, c, d, $t_x$, and $t_y$ represent parameters of an affine transformation that is applied to x and y to produce x' and y'.

In one embodiment, generator model 202 includes a variational autoencoder (VAE) 224 and/or a spatial transformer network (STN) 228. In this embodiment, an encoder portion of VAE 224 is applied to a semantic representation of a scene and random input 214 to generate a vector in a latent space. The vector is then inputted into STN 228 to produce one or more affine transformations 230 representing bounding boxes for objects in the scene. Consequently, each affine transformation may specify the location and scale of a corresponding object in the scene.

For example, random input 214 may include a random vector with a standard normal distribution that is combined (e.g., concatenated) with a given semantic representation of an image to generate input to VAE 224. Training engine 122 may apply the encoder portion of VAE 224 to the combination of random input 214 and the semantic representation to produce a vector in a latent space, which also has a standard normal distribution. Training engine 122 may then use STN 228 to convert the vector into an affine transformation representing a bounding box for an object to be inserted into the scene.

In one embodiment, training engine 122 inputs semantic representations 200 of scenes and corresponding affine transformations 230 produced by generator model 202 into generator model 204. Generator model 204 outputs shapes 232 of objects 260 within bounding boxes represented by affine transformations 230. In one embodiment, generator model 204 includes another VAE 226. In this embodiment, an encoder portion of VAE 226 is applied to a semantic representation of a scene that includes one or more affine transformations 230 outputted by generator model 202 and random input 214 to generate a vector in a latent space. The vector is then inputted into a decoder portion of VAE 226 to generate one or more shapes 232 that fit into bounding boxes represented by affine transformations 230.

For example, random input 216 may include a random vector with a standard normal distribution that is combined (e.g., concatenated) with a semantic representation of an image to generate input to VAE 226. The semantic representation may be updated to include regions of pixels 218 and corresponding labels 220 for bounding boxes represented by affine transformations 230. Training engine 122 may apply the encoder portion of VAE 226 to the input to produce a vector in a latent space, which also has a standard normal distribution. Training engine 122 may then apply the decoder portion of VAE 226 to the vector to generate binary masks containing shapes of objects within bounding boxes represented by affine transformations 230.

In various embodiments, affine transformations 230 outputted by STN 228 may act as differentiable links between generator models 202-204. As a result, training engine 122 may perform joint training and/or updating of generator models 202-204 using the differentiable links. In such a manner, generator models 202-204 operate as an end-to-end machine learning model that learns the joint distribution of the locations and shapes of different types of objects 260 in semantic representations 200 of scenes.

More specifically, in one embodiment, training engine 122 combines the output of generator models 202-204 with corresponding predictions 234-240 from affine discriminator 206, layout discriminators 208-210, and shape discriminator 212 to train and/or update generator models 202-204. In this embodiment, training engine 122 inputs affine transformations 230 outputted by generator model 202 and/or ground truths 222 for object locations in semantic representations 200 into affine discriminator 206 and layout discriminator 208. Affine discriminator 206 may output predictions 234 that classify the parameters of affine transformations 230 as real or fake, and layout discriminator 208 may output predictions 236 that classify the placement of the corresponding bounding boxes in semantic representations 200 as real or fake.

In one embodiment, training engine 122 also inputs shapes 232 outputted by generator model 204 and ground truths 222 for object shapes 232 in semantic representations 200 into layout discriminator 210 and shape discriminator 212. Layout discriminator may output predictions 238 that classify the placement of shapes 232 in semantic representations 200 as real or fake, and shape discriminator 212 may output predictions 240 that classify the generated shapes 232 as real or fake. Training engine 122 then calculates losses 242-248 based on predictions 234-240 from the discriminator models and uses gradients associated with losses 242-248 to update the parameters of generator models 202-204.

In various embodiments, training engine 122 may combine generator models 202-204, affine discriminator 206, layout discriminators 208-210, and shape discriminator 212 into GANs, with each generator model and the corresponding discriminator models trained against one another. For example, generator models 202-204, affine discriminator 206, layout discriminators 208-210, and shape discriminator 212 may be included in convolutional GANs, conditional GANs, cycle GANs, Wasserstein GANs, and/or other types of GANs. In turn, generator models 202-204 may produce more realistic affine transformations 230 and shapes 232, and the discriminator models may learn to better distinguish between real and fake object locations and shapes in semantic representations 200 of scenes.

In one embodiment, to increase the diversity of affine transformations 230 and shapes 232 produced by generator models 202-204, training engine 122 may update generator models 202-204 via both supervised paths 250-252 and unsupervised paths 254-256. Supervised path 250 may include, as additional input into generator model 202, ground truths 222 for bounding boxes of objects that can be inserted into the corresponding semantic representations 200. Similarly, supervised path 252 may include, as additional input to generator model 204, ground truths 222 for shapes 232 of objects that can be inserted into the corresponding semantic representations.

As a result, supervised paths 250-252 may allow generator models 202-204 to learn additional locations and/or shapes of objects in scenes beyond those generated via unsupervised paths 254-256, which lack ground truths 222 for the objects' locations and shapes. For example, training of generator models 202-204 via unsupervised paths 254-256 may cause generator models 202-204 to effectively ignore random input 214-216 during generation of the corresponding affine transformations 230 and/or shapes 232. By adding supervised paths 250-252 to the training pipeline for generator models 202-204, training engine 122 may train VAEs 224-226 and/or STN 228 to reconstruct the corresponding ground truths 222 inputted into generator models 202-204, thus allowing different values of random input 214-216 to produce different bounding boxes and shapes 232 of objects in a given scene.

In one embodiment, the training of generator model 202 may be performed using a minimax game between generator model 202, affine discriminator 208, and layout discriminator 208 with the following loss function:

$$L_l(G_l, D_l) = L_l^{adv}(G_l, D_{layout}^{box}) + L_l^{recon}(G_l) + L_l^{sup}(G_l, D_{affine})$$

In the above function, $L_l$ represents the loss associated with a GAN containing generator model 202, affine discriminator 206, and layout discriminator 208; $G_l$ represents generator model 202; and $D_l$ represents discriminators that are related to the output of generator model 202 (i.e., affine discriminator 206 and layout discriminator 208). The loss includes three components: an unsupervised adversarial loss denoted by $L_l^{adv}$, a reconstruction loss denoted by $L_l^{recon}$, and a supervised adversarial loss denoted by $L_l^{sup}$. The unsupervised adversarial loss (e.g., losses 244) is determined based on generator model 202 and layout discriminator 208, as denoted by $D_{layout}^{box}$. The reconstruction loss is determined based on generator model 202. The supervised adversarial loss (e.g., losses 242) is determined based on generator model 202 and affine discriminator 206, as denoted by $D_{affine}$.

In one embodiment, training engine 122 uses the unsupervised adversarial loss to update generator model 202 via unsupervised path 254. For example, the unsupervised adversarial loss may be calculated using the following equation:

$$L_l^{adv}(g_l, D_{layout}^{box}) = E_x[\log D_{layout}^{box}(x \oplus A(b))] = E_{x,z_l}[D_{layout}^{box}(x \oplus \hat{A}(b))]$$

In the above equation, $z_l$ represents random input 214, x represents a semantic representation inputted into generator model 202, A(b) represents an affine transformation matrix A that is applied to a unit bounding box b to produce a ground truth bounding box for an object, and $\hat{A}(b)$ represents a prediction of A by generator model 202.

In one embodiment, the reconstruction loss is also used to update generator model 202 via unsupervised path 254. For example, the reconstruction loss may be calculated using the following equation:

$$L_l^{recon}(G_l) = \|x'-x\|_1 + \|z_l'-z_l\|_1$$

In the above equation, x' and $z'_l$ represent reconstructions of x and $z_l$, respectively, that are produced from the latent vector generated by VAE 224. As a result, the reconstruction loss may be used to ensure that both random input 214 and the semantic representation inputted into generator model 202 are encoded in the latent vector.

In one embodiment, the supervised adversarial loss is used to update generator model 202 via supervised path 250. For example, the supervised adversarial loss may be calculated using the following equation:

$$L_l^{sup}(G_l, D_{affine}) = E_{z_A-E_A}\|A-\tilde{A}\| + KL(z_A\|z_l)L^{sup,adv}(G_l, D_{affine})$$

In the above equation, A is an affine transformation that produces a realistic bounding box given a ground truth, $\tilde{A}$ is a predicted affine transformation generated via supervised path 250. $z_A$ represents a vector that is encoded from parameters of a ground truth bounding box for an object, EA represents an encoder that encodes parameters of an input affine transform A, KL denotes the Kullback-Leibler divergence, and $L^{sup,adv}$ represents an adversarial loss that focuses on predicting a realistic $\tilde{A}$. In turn, the equation may be used to update generator model 202 so that generator model 202 maps $z_A$ to A for each ground truth.

In one embodiment, the training of generator model 204 may be performed using a minimax game between generator model 204, layout discriminator 210, and shape discriminator 212 with the following loss function:

$$L_s(G_s, D_s) = L_s^{adv}(G_s, D_{layout}^{instance}) + L_s^{recon}(G_s) + L_s^{sup}(G_s, D_{shape})$$

$L_s$ represents the loss associated with a GAN containing generator model 204, layout discriminator 210, and shape discriminator 212; $G_s$ represents generator model 204; and $D_s$ represents discriminators that are related to the output of generator model 204 (i.e., layout discriminator 210 and shape discriminator 212). Like the loss function for updating generator model 202, the loss function above includes three components: an unsupervised adversarial loss denoted by $L_s^{adv}$, a reconstruction loss denoted by $L_s^{recon}$, and a supervised adversarial loss denoted by $L_s^{sup}$. The unsupervised adversarial loss (e.g., losses 246) is determined based on generator model 204 and layout discriminator 210, as denoted by $D_{layout}^{isntance}$. The reconstruction loss is determined based on generator model 202. The supervised adversarial loss (e.g., losses 248) is determined based on generator model 204 and shape discriminator 212, as denoted by $D_{shape}$.

In one embodiment, the role of each component in the loss function for updating generator model 204 is similar to that of the corresponding component of the loss function for updating generator model 204. That is, the unsupervised adversarial loss and reconstruction loss are used to update generator model 204 via unsupervised path 256, and the supervised adversarial loss is used to update generator model 204 via supervised path 252. On the other hand, the supervised adversarial loss may be used to train generator model 204 to reconstruct a ground truth shape for an object instead of a ground truth bounding box and/or location for the object. Moreover, one or more losses 246-248 associated with generator model 204, layout discriminator 210, and shape discriminator 212 may be propagated backwards through VAE 226 of generator model 204 and STN 228 of generator model 202 so that losses 246-248 associated with generating shapes 232 are used to adjust the parameters of both generator models 202-204.

In one embodiment, after training of generator models 202-204 is complete, execution engine 124 applies generator models 202-204 to additional images 258 from an image repository 264 to insert objects 260 into images 258. For example, execution engine 124 may execute unsupervised path 254 containing generator model 202, affine discriminator 206, and layout discriminator 208 to generate affine transformations 230 representing bounding boxes for objects 260 based on random input 214 and semantic representations 200 of images 258. Execution engine 124 may then execute unsupervised path 256 containing generator model 204, layout discriminator 210, and shape discriminator 212 to generate shapes 232 that fit into the bounding boxes based on random input 216, semantic representations 200, and affine transformations 230. Finally, execution engine 124 may apply affine transformations 230 to the corresponding shapes 232 to insert objects 260 into images 258 at the predicted locations.

Figure 3:
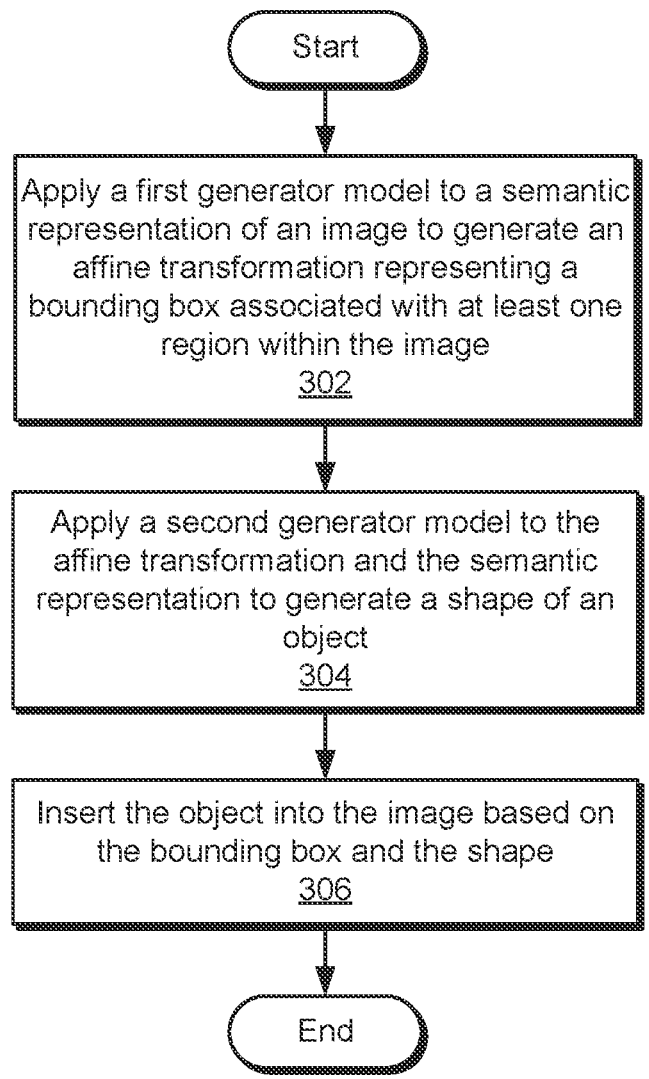
FIG. 3 is a flow diagram of method steps for performing joint synthesis and placement of an object in a scene, according to various embodiments.

FIG. 3 is a flow diagram of method steps for performing joint synthesis and placement of an object in a scene, according to various embodiments. Although the method steps are described in conjunction with the systems of FIGS. 1 and 2, persons skilled in the art will understand that any system configured to perform the method steps in any order falls within the scope of the present disclosure.

As shown, execution engine 124 applies 302 a first generator model to a semantic representation of an image to generate an affine transformation representing a bounding box associated with at least one region within the image. For example, the first generator model may include a VAE and an STN. Input to the VAE may include the semantic representation and random input (e.g., a random vector). In turn, an encoder in the VAE may generate a latent vector from the input, and the STN may convert the latent vector into an affine transformation that specifies both the location and scale of an object to be inserted into the image.

Next, execution engine 124 applies 304 a second generator model to the affine transformation and the semantic representation to generate a shape of the object. For example, the second generator model may also include a VAE. Input to the VAE may include the semantic representation, the affine transformation, and random input (e.g., a random vector). The VAE in the second generator model may generate, based on the input, a shape that represents the object and fits the location and scale indicated by the affine transformation.

Execution engine 124 then inserts 306 the object into the image based on the bounding box and the shape. For example, execution engine 124 may apply the affine transformation to the shape to obtain a region of pixels in the image containing the object. Execution engine 124 may then insert the object into the image by updating the semantic representation to include a mapping of the region of pixels to a label for the object.

Figure 4:
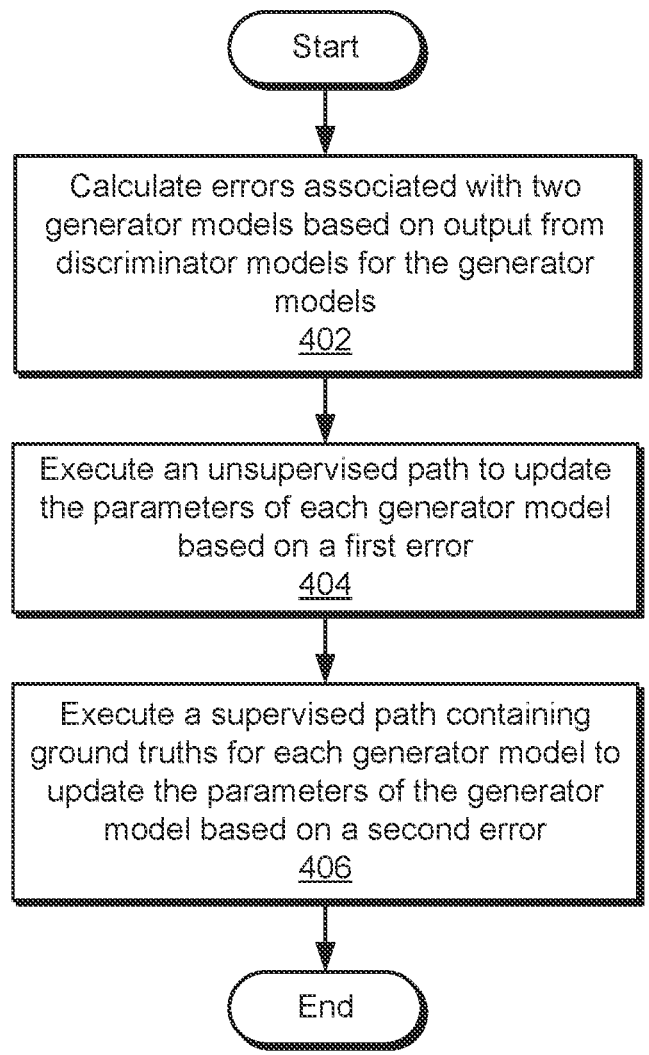
FIG. 4 is a flow diagram of method steps for training machine learning models that perform joint synthesis and placement of objects in scenes, according to various embodiments.

FIG. 4 is a flow diagram of method steps for training machine learning models that perform joint synthesis and placement of objects in scenes, according to various embodiments. Although the method steps are described in conjunction with the systems of FIGS. 1 and 2, persons skilled in the art will understand that any system configured to perform the method steps in any order falls within the scope of the present disclosure.

As shown, training engine 122 calculates 402 errors associated with two generator models based on output from discriminator models for the generator models. For example, the discriminator models for a generator model that outputs an affine transformation representing a bounding box for an object may include a layout discriminator model that categorizes a location of the bounding box in an image as real or fake and an affine discriminator model that categorizes the affine transformation as real or fake. In another example, the discriminator models for another generator model that outputs a shape of an object within the bounding box may include a layout discriminator model that categorizes a location of the shape in the image as real or fake and a shape discriminator model that categorizes the shape as real or fake. The errors may include losses that are calculated based on predictions of the discriminator models and/or the output of the corresponding generator models.

Next, training engine 122 executes 404 an unsupervised path to update the parameters of each generator model based on a first error. Training engine 122 also executes 406 a supervised path containing ground truths for each generator model to update the parameters of the generator model based on a second error.

For example, the first error may include an unsupervised adversarial loss that is calculated from a first discriminator model for the generator model and/or a reconstruction loss associated with random input to the generator model, and the second error may include a supervised adversarial loss that is calculated from a second discriminator model for the generator model. As a result, the unsupervised paths may be used to improve the performance of the generator models in producing realistic bounding boxes and/or shapes of objects in the corresponding images, and the supervised paths may be used with the ground truths to increase the diversity of the bounding boxes and/or shapes produced by the generator models.

Example Hardware Architecture

Figure 5:
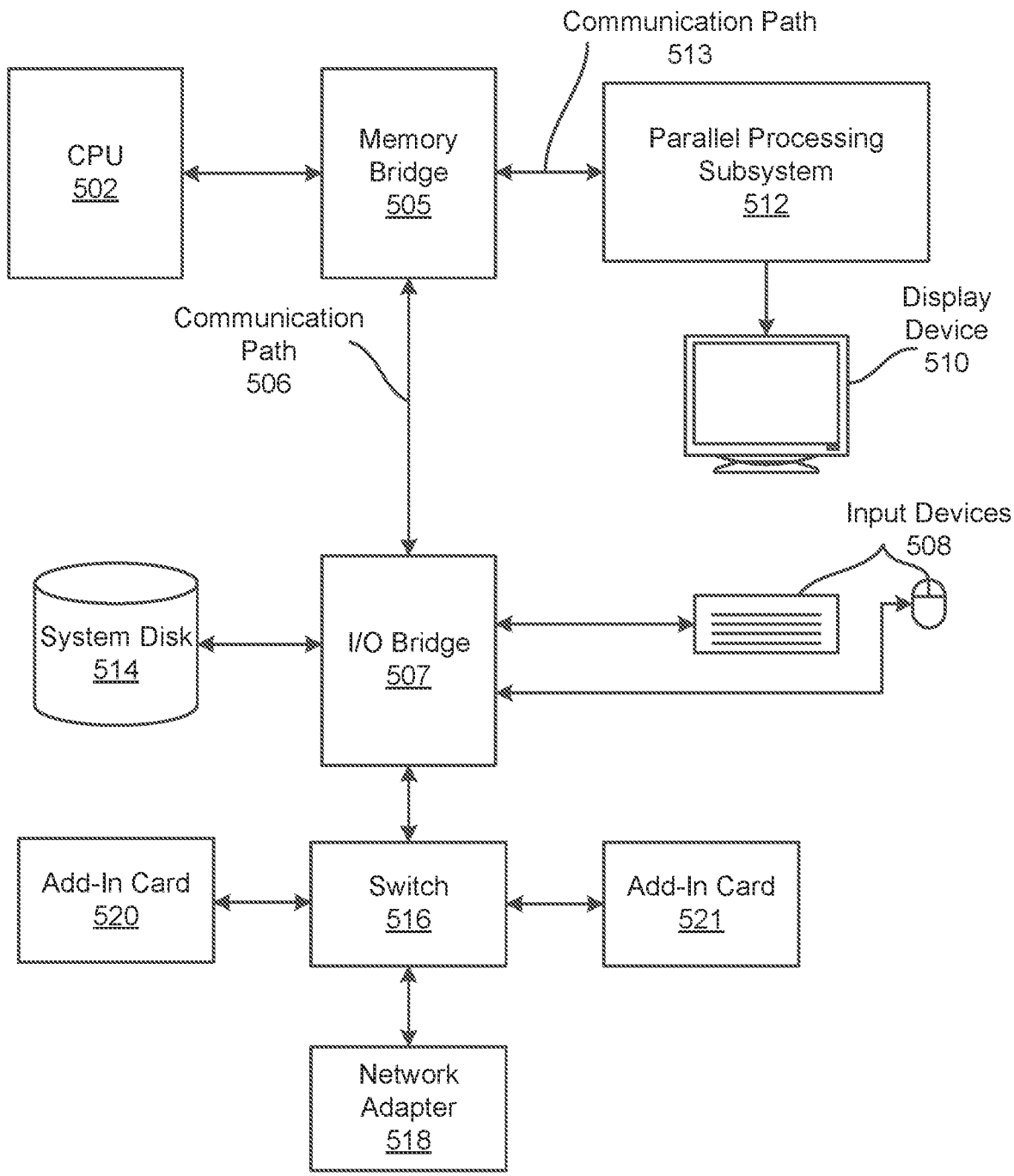
FIG. 5 is a block diagram illustrating a computer system configured to implement one or more aspects of various embodiments.

FIG. 5 is a block diagram illustrating a computer system 500 configured to implement one or more aspects of various embodiments. In some embodiments, computer system 500 is a server machine operating in a data center or a cloud computing environment that provides scalable computing resources as a service over a network.

In various embodiments, computer system 500 includes, without limitation, a central processing unit (CPU) 502 and a system memory 504 coupled to a parallel processing subsystem 512 via a memory bridge 505 and a communication path 513. Memory bridge 505 is further coupled to an I/O (input/output) bridge 507 via a communication path 506, and I/O bridge 507 is, in turn, coupled to a switch 516.

In one embodiment, I/O bridge 507 is configured to receive user input information from optional input devices 508, such as a keyboard or a mouse, and forward the input information to CPU 502 for processing via communication path 506 and memory bridge 505. In some embodiments, computer system 500 may be a server machine in a cloud computing environment. In such embodiments, computer system 500 may not have input devices 508. Instead, computer system 500 may receive equivalent input information by receiving commands in the form of messages transmitted over a network and received via the network adapter 518. In one embodiment, switch 516 is configured to provide connections between I/O bridge 507 and other components of the computer system 500, such as a network adapter 518 and various add-in cards 520 and 521.

In one embodiment, I/O bridge 507 is coupled to a system disk 514 that may be configured to store content and applications and data for use by CPU 502 and parallel processing subsystem 512. In one embodiment, system disk 514 provides non-volatile storage for applications and data and may include fixed or removable hard disk drives, flash memory devices, and CD-ROM (compact disc read-only-memory), DVD-ROM (digital versatile disc-ROM), Blu-ray, HD-DVD (high definition DVD), or other magnetic, optical, or solid state storage devices. In various embodiments, other components, such as universal serial bus or other port connections, compact disc drives, digital versatile disc drives, film recording devices, and the like, may be connected to I/O bridge 507 as well.

In various embodiments, memory bridge 505 may be a Northbridge chip, and I/O bridge 507 may be a Southbridge chip. In addition, communication paths 506 and 513, as well as other communication paths within computer system 500, may be implemented using any technically suitable protocols, including, without limitation, AGP (Accelerated Graphics Port), HyperTransport, or any other bus or point-to-point communication protocol known in the art.

In some embodiments, parallel processing subsystem 512 comprises a graphics subsystem that delivers pixels to an optional display device 510 that may be any conventional cathode ray tube, liquid crystal display, light-emitting diode display, or the like. In such embodiments, the parallel processing subsystem 512 incorporates circuitry optimized for graphics and video processing, including, for example, video output circuitry. As described in greater detail below in conjunction with FIGS. 6 and 7, such circuitry may be incorporated across one or more parallel processing units (PPUs), also referred to herein as parallel processors, included within parallel processing subsystem 512. In other embodiments, the parallel processing subsystem 512 incorporates circuitry optimized for general purpose and/or compute processing. Again, such circuitry may be incorporated across one or more PPUs included within parallel processing subsystem 512 that are configured to perform such general purpose and/or compute operations. In yet other embodiments, the one or more PPUs included within parallel processing subsystem 512 may be configured to perform graphics processing, general purpose processing, and compute processing operations. System memory 504 includes at least one device driver configured to manage the processing operations of the one or more PPUs within parallel processing subsystem 512.

In various embodiments, parallel processing subsystem 512 may be integrated with one or more of the other elements of FIG. 5 to form a single system. For example, parallel processing subsystem 512 may be integrated with CPU 502 and other connection circuitry on a single chip to form a system on chip (SoC).

In one embodiment, CPU 502 is the master processor of computer system 500, controlling and coordinating operations of other system components. In one embodiment, CPU 502 issues commands that control the operation of PPUs. In some embodiments, communication path 513 is a PCI Express link, in which dedicated lanes are allocated to each PPU, as is known in the art. Other communication paths may also be used. PPU advantageously implements a highly parallel processing architecture. A PPU may be provided with any amount of local parallel processing memory (PP memory).

It will be appreciated that the system shown herein is illustrative and that variations and modifications are possible. The connection topology, including the number and arrangement of bridges, the number of CPUs 502, and the number of parallel processing subsystems 512, may be modified as desired. For example, in some embodiments, system memory 504 could be connected to CPU 502 directly rather than through memory bridge 505, and other devices would communicate with system memory 504 via memory bridge 505 and CPU 502. In other embodiments, parallel processing subsystem 512 may be connected to I/O bridge 507 or directly to CPU 502, rather than to memory bridge 505. In still other embodiments, I/O bridge 507 and memory bridge 505 may be integrated into a single chip instead of existing as one or more discrete devices. Lastly, in certain embodiments, one or more components shown in FIG. 5 may not be present. For example, switch 516 could be eliminated, and network adapter 518 and add-in cards 520, 521 would connect directly to I/O bridge 507.

Figure 6:
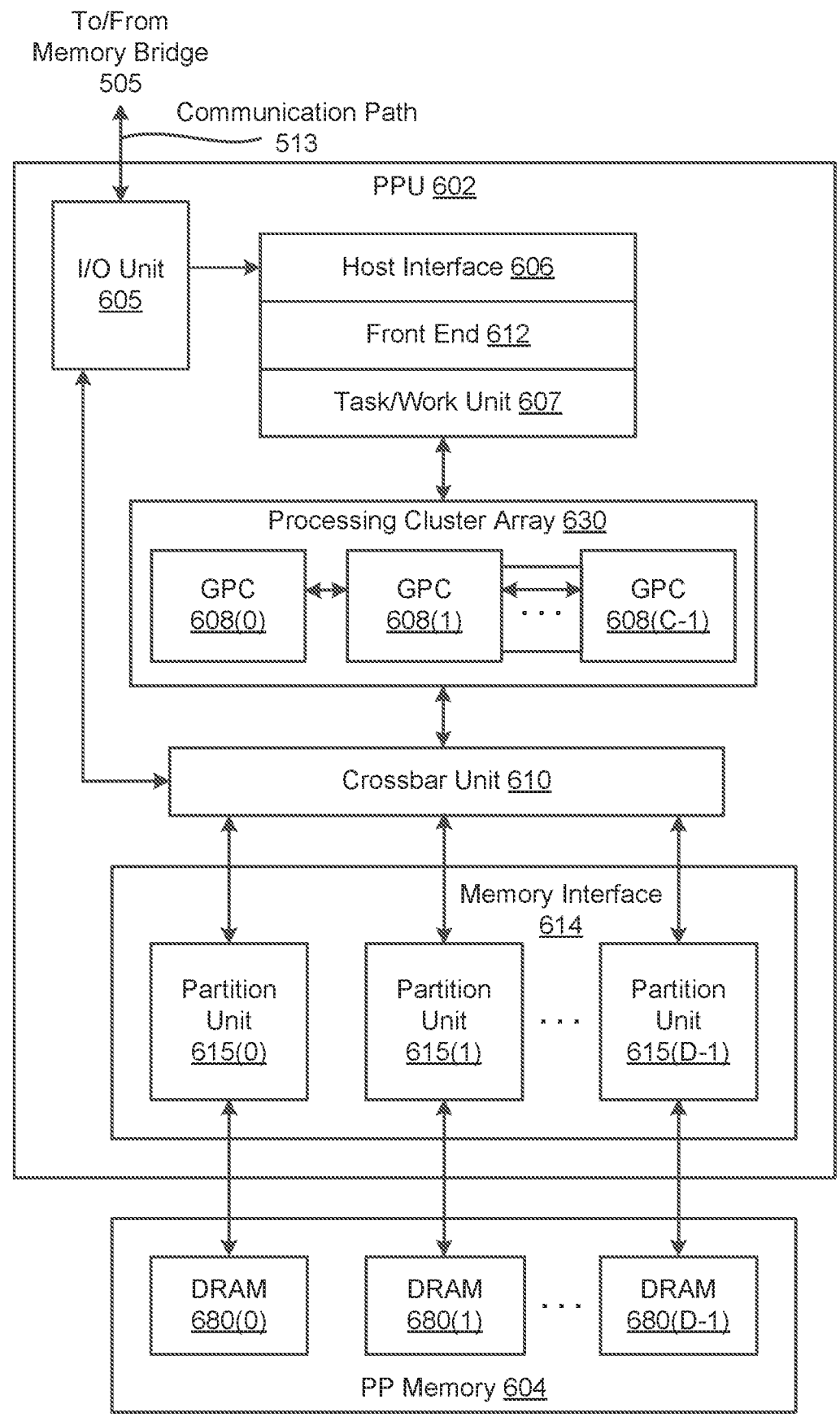
FIG. 6 is a block diagram of a parallel processing unit (PPU) included in the parallel processing subsystem of FIG. 5, according to various embodiments.

FIG. 6 is a block diagram of a parallel processing unit (PPU) 602 included in the parallel processing subsystem 512 of FIG. 5, according to various embodiments. Although FIG. 6 depicts one PPU 602, as indicated above, parallel processing subsystem 512 may include any number of PPUs 602. As shown, PPU 602 is coupled to a local parallel processing (PP) memory 604. PPU 602 and PP memory 604 may be implemented using one or more integrated circuit devices, such as programmable processors, application specific integrated circuits (ASICs), or memory devices, or in any other technically feasible fashion.

In some embodiments, PPU 602 comprises a graphics processing unit (GPU) that may be configured to implement a graphics rendering pipeline to perform various operations related to generating pixel data based on graphics data supplied by CPU 502 and/or system memory 504. When processing graphics data, PP memory 604 can be used as graphics memory that stores one or more conventional frame buffers and, if needed, one or more other render targets as well. Among other things, PP memory 604 may be used to store and update pixel data and deliver final pixel data or display frames to an optional display device 510 for display. In some embodiments, PPU 602 also may be configured for general-purpose processing and compute operations. In some embodiments, computer system 500 may be a server machine in a cloud computing environment. In such embodiments, computer system 500 may not have a display device 510. Instead, computer system 500 may generate equivalent output information by transmitting commands in the form of messages over a network via the network adapter 518.

In some embodiments, CPU 502 is the master processor of computer system 500, controlling and coordinating operations of other system components. In one embodiment, CPU 502 issues commands that control the operation of PPU 602. In some embodiments, CPU 502 writes a stream of commands for PPU 602 to a data structure (not explicitly shown in either FIG. 5 or FIG. 6) that may be located in system memory 504, PP memory 604, or another storage location accessible to both CPU 502 and PPU 602. A pointer to the data structure is written to a command queue, also referred to herein as a pushbuffer, to initiate processing of the stream of commands in the data structure. In one embodiment, the PPU 602 reads command streams from the command queue and then executes commands asynchronously relative to the operation of CPU 502. In embodiments where multiple pushbuffers are generated, execution priorities may be specified for each pushbuffer by an application program via device driver to control scheduling of the different pushbuffers.

In one embodiment, PPU 602 includes an I/O (input/output) unit 605 that communicates with the rest of computer system 500 via the communication path 513 and memory bridge 505. In one embodiment, I/O unit 605 generates packets (or other signals) for transmission on communication path 513 and also receives all incoming packets (or other signals) from communication path 513, directing the incoming packets to appropriate components of PPU 602. For example, commands related to processing tasks may be directed to a host interface 606, while commands related to memory operations (e.g., reading from or writing to PP memory 604) may be directed to a crossbar unit 610. In one embodiment, host interface 606 reads each command queue and transmits the command stream stored in the command queue to a front end 612.

As mentioned above in conjunction with FIG. 5, the connection of PPU 602 to the rest of computer system 500 may be varied. In some embodiments, parallel processing subsystem 512, which includes at least one PPU 602, is implemented as an add-in card that can be inserted into an expansion slot of computer system 500. In other embodiments, PPU 602 can be integrated on a single chip with a bus bridge, such as memory bridge 505 or I/O bridge 507. Again, in still other embodiments, some or all of the elements of PPU 602 may be included along with CPU 502 in a single integrated circuit or system of chip (SoC).

In one embodiment, front end 612 transmits processing tasks received from host interface 606 to a work distribution unit (not shown) within task/work unit 607. In one embodiment, the work distribution unit receives pointers to processing tasks that are encoded as task metadata (TMD) and stored in memory. The pointers to TMDs are included in a command stream that is stored as a command queue and received by the front end unit 612 from the host interface 606. Processing tasks that may be encoded as TMDs include indices associated with the data to be processed as well as state parameters and commands that define how the data is to be processed. For example, the state parameters and commands could define the program to be executed on the data. Also for example, the TMD could specify the number and configuration of the set of CTAs. Generally, each TMD corresponds to one task. The task/work unit 607 receives tasks from the front end 612 and ensures that GPCs 608 are configured to a valid state before the processing task specified by each one of the TMDs is initiated. A priority may be specified for each TMD that is used to schedule the execution of the processing task. Processing tasks also may be received from the processing cluster array 630. Optionally, the TMD may include a parameter that controls whether the TMD is added to the head or the tail of a list of processing tasks (or to a list of pointers to the processing tasks), thereby providing another level of control over execution priority.

In one embodiment, PPU 602 implements a highly parallel processing architecture based on a processing cluster array 630 that includes a set of C general processing clusters (GPCs) 608, where C 1. Each GPC 608 is capable of executing a large number (e.g., hundreds or thousands) of threads concurrently, where each thread is an instance of a program. In various applications, different GPCs 608 may be allocated for processing different types of programs or for performing different types of computations. The allocation of GPCs 608 may vary depending on the workload arising for each type of program or computation.

In one embodiment, memory interface 614 includes a set of D of partition units 615, where D 1. Each partition unit 615 is coupled to one or more dynamic random access memories (DRAMs) 620 residing within PPM memory 604. In some embodiments, the number of partition units 615 equals the number of DRAMs 620, and each partition unit 615 is coupled to a different DRAM 620. In other embodiments, the number of partition units 615 may be different than the number of DRAMs 620. Persons of ordinary skill in the art will appreciate that a DRAM 620 may be replaced with any other technically suitable storage device. In operation, various render targets, such as texture maps and frame buffers, may be stored across DRAMs 620, allowing partition units 615 to write portions of each render target in parallel to efficiently use the available bandwidth of PP memory 604.

In one embodiment, a given GPC 608 may process data to be written to any of the DRAMs 620 within PP memory 604. In one embodiment, crossbar unit 610 is configured to route the output of each GPC 608 to the input of any partition unit 615 or to any other GPC 608 for further processing. GPCs 608 communicate with memory interface 614 via crossbar unit 610 to read from or write to various DRAMs 620. In some embodiments, crossbar unit 610 has a connection to I/O unit 605, in addition to a connection to PP memory 604 via memory interface 614, thereby enabling the processing cores within the different GPCs 608 to communicate with system memory 504 or other memory not local to PPU 602. In the embodiment of FIG. 6, crossbar unit 610 is directly connected with I/O unit 605. In various embodiments, crossbar unit 610 may use virtual channels to separate traffic streams between the GPCs 608 and partition units 615.

In one embodiment, GPCs 608 can be programmed to execute processing tasks relating to a wide variety of applications, including, without limitation, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel/fragment shader programs), general compute operations, etc. In operation, PPU 602 is configured to transfer data from system memory 504 and/or PP memory 604 to one or more on-chip memory units, process the data, and write result data back to system memory 504 and/or PP memory 604. The result data may then be accessed by other system components, including CPU 502, another PPU 602 within parallel processing subsystem 512, or another parallel processing subsystem 512 within computer system 500.

In one embodiment, any number of PPUs 602 may be included in a parallel processing subsystem 512. For example, multiple PPUs 602 may be provided on a single add-in card, or multiple add-in cards may be connected to communication path 513, or one or more of PPUs 602 may be integrated into a bridge chip. PPUs 602 in a multi-PPU system may be identical to or different from one another. For example, different PPUs 602 might have different numbers of processing cores and/or different amounts of PP memory 604. In implementations where multiple PPUs 602 are present, those PPUs may be operated in parallel to process data at a higher throughput than is possible with a single PPU 602. Systems incorporating one or more PPUs 602 may be implemented in a variety of configurations and form factors, including, without limitation, desktops, laptops, handheld personal computers or other handheld devices, servers, workstations, game consoles, embedded systems, and the like.

Figure 7:
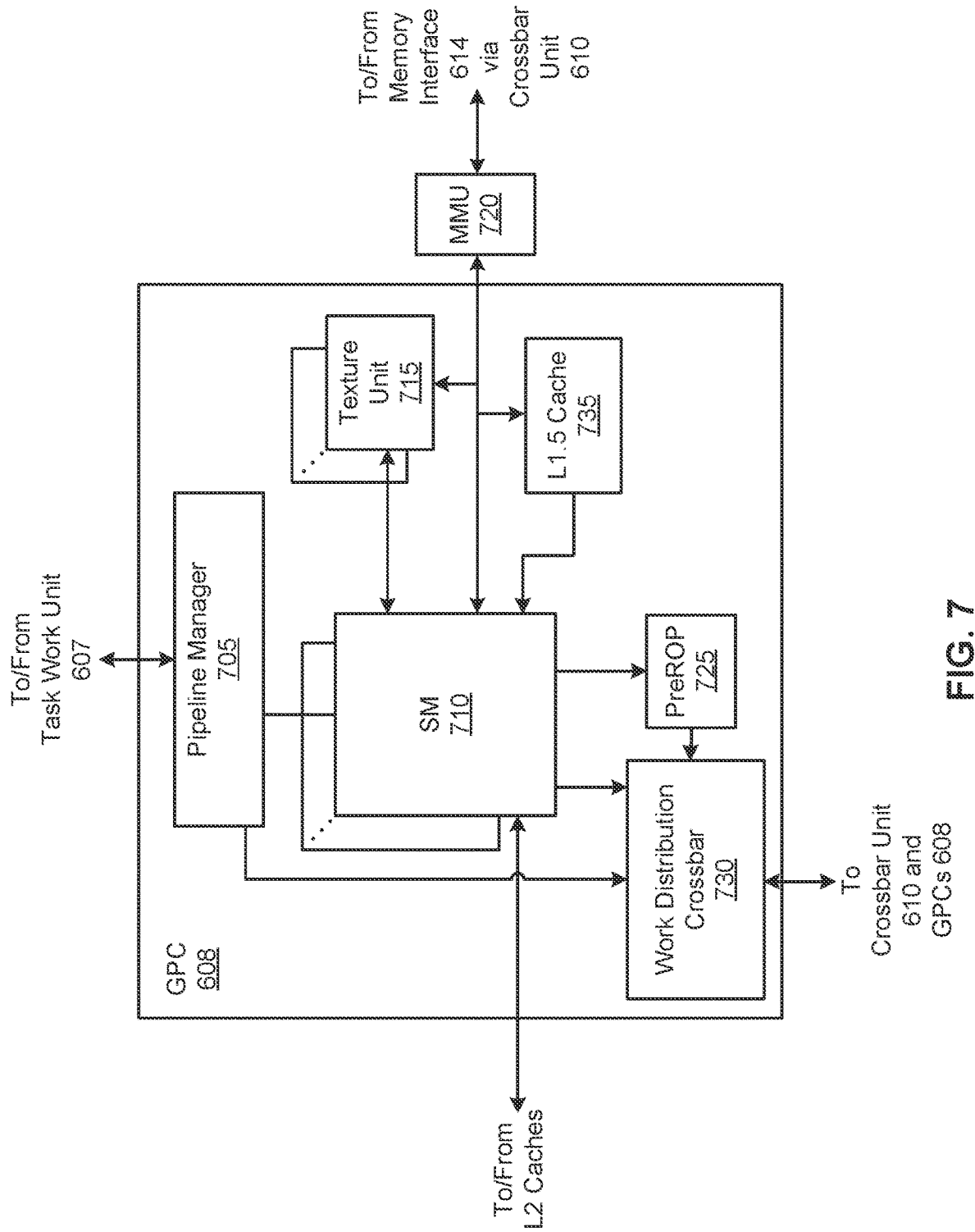
FIG. 7 is a block diagram of a general processing cluster (GPC) included in the parallel processing unit (PPU) of FIG. 6, according to various embodiments.

FIG. 7 is a block diagram of a general processing cluster (GPC) 608 included in the parallel processing unit (PPU) 602 of FIG. 6, according to various embodiments. As shown, the GPC 608 includes, without limitation, a pipeline manager 705, one or more texture units 715, a preROP unit 725, a work distribution crossbar 730, and an L1.5 cache 735.

In one embodiment, GPC 608 may be configured to execute a large number of threads in parallel to perform graphics, general processing and/or compute operations. As used herein, a "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within GPC 608. Unlike a SIMD execution regime, where all processing engines typically execute identical instructions, SIMT execution allows different threads to more readily follow divergent execution paths through a given program. Persons of ordinary skill in the art will understand that a SIMD processing regime represents a functional subset of a SIMT processing regime.

In one embodiment, operation of GPC 608 is controlled via a pipeline manager 705 that distributes processing tasks received from a work distribution unit (not shown) within task/work unit 607 to one or more streaming multiprocessors (SMs) 710. Pipeline manager 705 may also be configured to control a work distribution crossbar 730 by specifying destinations for processed data output by SMs 710.

In various embodiments, GPC 608 includes a set of M of SMs 710, where M≥1. Also, each SM 710 includes a set of functional execution units (not shown), such as execution units and load-store units. Processing operations specific to any of the functional execution units may be pipelined, which enables a new instruction to be issued for execution before a previous instruction has completed execution. Any combination of functional execution units within a given SM 710 may be provided. In various embodiments, the functional execution units may be configured to support a variety of different operations including integer and floating point arithmetic (e.g., addition and multiplication), comparison operations, Boolean operations (AND, OR, 5OR), bit-shifting, and computation of various algebraic functions (e.g., planar interpolation and trigonometric, exponential, and logarithmic functions, etc.). Advantageously, the same functional execution unit can be configured to perform different operations.

In various embodiments, each SM 710 includes multiple processing cores. In one embodiment, the SM 710 includes a large number (e.g., 128, etc.) of distinct processing cores. Each core may include a fully-pipelined, single-precision, double-precision, and/or mixed precision processing unit that includes a floating point arithmetic logic unit and an integer arithmetic logic unit. In one embodiment, the floating point arithmetic logic units implement the IEEE 754-2008 standard for floating point arithmetic. In one embodiment, the cores include 64 single-precision (32-bit) floating point cores, 64 integer cores, 32 double-precision (64-bit) floating point cores, and 8 tensor cores.

In one embodiment, tensor cores configured to perform matrix operations, and, in one embodiment, one or more tensor cores are included in the cores. In particular, the tensor cores are configured to perform deep learning matrix arithmetic, such as convolution operations for neural network training and inferencing. In one embodiment, each tensor core operates on a 4×4 matrix and performs a matrix multiply and accumulate operation D=A×B+C, where A, B, C, and D are 4×4 matrices.

In one embodiment, the matrix multiply inputs A and B are 16-bit floating point matrices, while the accumulation matrices C and D may be 16-bit floating point or 32-bit floating point matrices. Tensor Cores operate on 16-bit floating point input data with 32-bit floating point accumulation. The 16-bit floating point multiply requires 64 operations and results in a full precision product that is then accumulated using 32-bit floating point addition with the other intermediate products for a 4×4×4 matrix multiply. In practice, Tensor Cores are used to perform much larger two-dimensional or higher dimensional matrix operations, built up from these smaller elements. An API, such as CUDA 9 C++ API, exposes specialized matrix load, matrix multiply and accumulate, and matrix store operations to efficiently use tensor cores from a CUDA-C++ program. At the CUDA level, the warp-level interface assumes 16×16 size matrices spanning all 32 threads of the warp.

Neural networks rely heavily on matrix math operations, and complex multi-layered networks require tremendous amounts of floating-point performance and bandwidth for both efficiency and speed. In various embodiments, with thousands of processing cores, optimized for matrix math operations, and delivering tens to hundreds of TFLOPS of performance, the SMs 710 provide a computing platform capable of delivering performance required for deep neural network-based artificial intelligence and machine learning applications.

In various embodiments, each SM 710 may also comprise multiple special function units (SFUs) that perform special functions (e.g., attribute evaluation, reciprocal square root, and the like). In one embodiment, the SFUs may include a tree traversal unit configured to traverse a hierarchical tree data structure. In one embodiment, the SFUs may include texture unit configured to perform texture map filtering operations. In one embodiment, the texture units are configured to load texture maps (e.g., a 2D array of texels) from memory and sample the texture maps to produce sampled texture values for use in shader programs executed by the SM. In various embodiments, each SM 710 also comprises multiple load/store units (LSUs) that implement load and store operations between the shared memory/L1 cache and register files internal to the SM 710.

In one embodiment, each SM 710 is configured to process one or more thread groups. As used herein, a "thread group" or "warp" refers to a group of threads concurrently executing the same program on different input data, with one thread of the group being assigned to a different execution unit within an SM 710. A thread group may include fewer threads than the number of execution units within the SM 710, in which case some of the execution may be idle during cycles when that thread group is being processed. A thread group may also include more threads than the number of execution units within the SM 710, in which case processing may occur over consecutive clock cycles. Since each SM 710 can support up to G thread groups concurrently, it follows that up to G*M thread groups can be executing in GPC 608 at any given time.

Additionally, in one embodiment, a plurality of related thread groups may be active (in different phases of execution) at the same time within an SM 710. This collection of thread groups is referred to herein as a "cooperative thread array" ("CTA") or "thread array." The size of a particular CTA is equal to m*k, where k is the number of concurrently executing threads in a thread group, which is typically an integer multiple of the number of execution units within the SM 710, and m is the number of thread groups simultaneously active within the SM 710. In some embodiments, a single SM 710 may simultaneously support multiple CTAs, where such CTAs are at the granularity at which work is distributed to the SMs 710.

In one embodiment, each SM 710 contains a level one (L1) cache or uses space in a corresponding L1 cache outside of the SM 710 to support, among other things, load and store operations performed by the execution units. Each SM 710 also has access to level two (L2) caches (not shown) that are shared among all GPCs 608 in PPU 602. The L2 caches may be used to transfer data between threads. Finally, SMs 710 also have access to off-chip "global" memory, which may include PP memory 604 and/or system memory 504. It is to be understood that any memory external to PPU 602 may be used as global memory. Additionally, as shown in FIG. 7, a level one-point-five (L1.5) cache 735 may be included within GPC 608 and configured to receive and hold data requested from memory via memory interface 614 by SM 710. Such data may include, without limitation, instructions, uniform data, and constant data. In embodiments having multiple SMs 710 within GPC 608, the SMs 710 may beneficially share common instructions and data cached in L1.5 cache 735.

In one embodiment, each GPC 608 may have an associated memory management unit (MMU) 720 that is configured to map virtual addresses into physical addresses. In various embodiments, MMU 720 may reside either within GPC 608 or within the memory interface 614. The MMU 720 includes a set of page table entries (PTEs) used to map a virtual address to a physical address of a tile or memory page and optionally a cache line index. The MMU 720 may include address translation lookaside buffers (TLB) or caches that may reside within SMs 710, within one or more L1 caches, or within GPC 608.

In one embodiment, in graphics and compute applications, GPC 608 may be configured such that each SM 710 is coupled to a texture unit 715 for performing texture mapping operations, such as determining texture sample positions, reading texture data, and filtering texture data.

In one embodiment, each SM 710 transmits a processed task to work distribution crossbar 730 in order to provide the processed task to another GPC 608 for further processing or to store the processed task in an L2 cache (not shown), parallel processing memory 604, or system memory 504 via crossbar unit 610. In addition, a pre-raster operations (preROP) unit 725 is configured to receive data from SM 710, direct data to one or more raster operations (ROP) units within partition units 615, perform optimizations for color blending, organize pixel color data, and perform address translations.

It will be appreciated that the architecture described herein is illustrative and that variations and modifications are possible. Among other things, any number of processing units, such as SMs 710, texture units 715, or preROP units 725, may be included within GPC 608. Further, as described above in conjunction with FIG. 6, PPU 602 may include any number of GPCs 608 that are configured to be functionally similar to one another so that execution behavior does not depend on which GPC 608 receives a particular processing task. Further, each GPC 608 operates independently of the other GPCs 608 in PPU 602 to execute tasks for one or more application programs.

In sum, the disclosed techniques utilize multiple generator models to synthesize and place objects in scenes based on semantic representations of the scenes in images. Differentiable affine transformations representing bounding boxes for the objects may be passed between the generator models. Errors produced from predictions by discriminator models associated with the generator models may be used with the affine transformations to jointly update the parameters of the generator models. Supervised paths containing ground truth instances for the generator models may additionally be used in training to increase the diversity of the output of the generator models.

One technological advantage of the disclosed techniques is that the affine transformation provides a differentiable link between the two generator models. As a result, joint training and/or updating of the generator models may be performed using the differentiable link, so that the generator models operate as an end-to-end machine learning model that learns the joint distribution of the locations and shapes of different types of objects in semantic representations of images. Another technological advantage of the disclosed techniques includes increased diversity of the generator models' output, which is achieved by training the generator models using both supervised and unsupervised paths. Consequently, the disclosed techniques provide technological improvements in the training, execution, and performance of machine learning models, computer systems, applications, and/or techniques for contextually inserting objects into images and/or scenes.

1. In some embodiments, a method comprises applying a first generator model to a semantic representation of an image to generate an affine transformation, wherein the affine transformation represents a bounding box associated with at least one region within the image; applying a second generator model to the affine transformation and the semantic representation to generate a shape of an object; and inserting the object into the image based on the bounding box and the shape.

2. The method of clause 1, further comprising calculating one or more errors associated with the first generator model and the second generator model based on output from discriminator models associated with at least one of the first generator model and the second generator model; and updating parameters of at least one of the first generator model and the second generator model based on the one or more errors.

3. The method of clauses 1-2, wherein updating the parameters comprises executing an unsupervised path to update the parameters of the first generator model and the second generator model based on a first error in the one or more errors; and executing a supervised path comprising ground truths for the first generator model and the second generator model to update the parameters of the first and second generator models based on a second error in the one or more errors.

4. The method of any of clauses 1-3, wherein the first error comprises an unsupervised adversarial loss that is calculated from a first discriminator model for at least one of the first and second generator models.

5. The method of any of clauses 1-4, wherein the second error comprises a supervised adversarial loss that is calculated from a second discriminator model for at least one of the first and second generator models.

6. The method of any of clauses 1-5, wherein the first error comprises a reconstruction loss associated with random input to at least one of the first and second generator models.

7. The method of any of clauses 1-6, wherein a first discriminator model associated with the first generator model comprises a layout discriminator model that categorizes a location of the bounding box as real or fake or an affine discriminator model that categorizes the affine transformation as real or fake.

8. The method of any of clauses 1-7, wherein a first discriminator model associated with the second generator model comprises a layout discriminator model that categorizes a location of the shape as real or fake or a shape discriminator model that categorizes the shape as real or fake.

9. The method of any of clauses 1-8, wherein inserting the object into the image based on the bounding box and the shape comprises applying the affine transformation to the shape.

10. The method of any of clauses 1-9, wherein each of the first generator model and the second generator model comprises at least one of a variational autoencoder (VAE) and a spatial transformer network.

11. In some embodiments, a non-transitory computer readable medium stores instructions that, when executed by a processor, cause the processor to at least apply a first generator model to a semantic representation of an image to generate an affine transformation, wherein the affine transformation represents a bounding box associated with at least one region within the image; apply a second generator model to the affine transformation and the semantic representation to generate a shape of an object; and insert the object into the image based on the bounding box and the shape.

12. The non-transitory computer readable medium of clause 11, further comprising program instructions to cause the processor to calculate one or more errors associated with the first generator model and the second generator model based on output from discriminator models associated with at least one of the first generator model and the second generator model; and update parameters of at least one of the first generator model and the second generator model based on the one or more errors.

13. The non-transitory computer readable medium of any of clauses 11-12, wherein updating the parameters comprises executing an unsupervised path to update the parameters of the first generator model and the second generator model based on a first error in the one or more errors; and executing a supervised path comprising ground truths for the first generator model and the second generator model to update the parameters of the first and second generator models based on a second error in the one or more errors.

14. The non-transitory computer readable medium of any of clauses 11-13, wherein the first and second errors comprise at least one of an unsupervised adversarial loss that is calculated from a first discriminator model, a supervised adversarial loss that is calculated from a second discriminator model, and a reconstruction loss associated with random input to at least one of the first generator model and the second generator model.

15. The non-transitory computer readable medium of any of clauses 11-14, wherein the discriminator models comprise a layout discriminator model that categorizes a location of the bounding box as real or fake, an affine discriminator model that categorizes the affine transformation as real or fake, a layout discriminator model that categorizes a location of the shape as real or fake, and a shape discriminator model that categorizes the shape as real or fake.

16. In some embodiments, a system comprises a memory storing one or more instructions; and a processor that executes the instructions to at least apply a first generator model to a semantic representation of an image to generate an affine transformation, wherein the affine transformation represents a bounding box associated with at least one region within the image; apply a second generator model to the affine transformation and the semantic representation to generate a shape of an object; and insert the object into the image based on the bounding box and the shape.

17. The system of clause 16, wherein the processor executes the instructions to calculate one or more errors associated with the first generator model and the second generator model based on output from discriminator models associated with at least one of the first generator model and the second generator model; and update parameters of at least one of the first generator model and the second generator model based on the one or more errors in the one or more errors.

18. The system of any of clauses 16-17, wherein updating the parameters comprises executing an unsupervised path to update the parameters of the first generator model and the second generator model based on a first error in the one or more errors; and executing a supervised path comprising ground truths for the first generator model and the second generator model to update the parameters of the first and second generator models based on a second error.

19. The system of any of clauses 16-18, wherein the first and second errors comprise at least one of an unsupervised adversarial loss that is calculated from a first discriminator model, a supervised adversarial loss that is calculated from a second discriminator model, and a reconstruction loss associated with random input to at least one of the first generator model and the second generator model.

20. The system of any of clauses 16-19, wherein inserting the object into the image based on the bounding box and the shape comprises applying the affine transformation to the shape.

Any and all combinations of any of the claim elements recited in any of the claims and/or any elements described in this application, in any fashion, fall within the contemplated scope of the present disclosure and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. One or more processors, comprising:
    circuitry to use one or more neural networks to:
        identify a set of locations in an image into which to insert an object based, at least in part, on a segmentation map and a location of one or more other objects within the image;
        identify a shape of the object based, at least in part, on the set of locations; and
        insert the object into at least one of the set of locations based, at least in part, on the identified shape.

2. The one or more processors of claim 1, wherein the circuitry is further to:
    use the one or more neural networks to generate a transformation corresponding to a bounding box associated with at least one of the set of locations; and
    insert the object into the image based, at least in part, on the transformation.

3. The one or more processors of claim 2, wherein the circuitry is further to apply the transformation to the identified shape.

4. The one or more processors of claim 1, wherein the segmentation map comprises a first representation of the image classifying one or more pixels in the image.

5. The one or more processors of claim 1, wherein the circuitry is further to:
    calculate a region of pixels in the image based on the identified shape.

6. The one or more processors of claim 1, wherein the one or more neural networks include one or more generator models.

7. A system, comprising:
    one or more computers having one or more processors to use one or more neural networks to:
        identify a set of locations in an image into which to insert an object based, at least in part, on a segmentation map and a location of one or more other objects within the image;
        identify a shape of the object based, at least in part, on the set of locations; and
        insert the object into at least one of the set of locations based, at least in part, on the identified shape.

8. The system of claim 7, wherein the one or more processors are further to:
    obtain the segmentation map comprising a representation of the image;
    process the representation using a first neural network of the one or more neural networks to generate a transformation corresponding to the at least one of the set of locations; and
    process the transformation and the representation using a second neural network of the one or more neural networks to insert the object.

9. The system of claim 8, wherein the representation indicates classifications of pixels of the image.

10. The system of claim 7, wherein inserting the object is further based, at least in part, on a size of the object.

11. The system of claim 7, wherein the one or more processors are further to identify the at least one of the set of locations through one or more affine transformations, and wherein the one or more affine transformations include at least one of: a translation, scaling, and rotation.

12. The system of claim 7, wherein the one or more neural networks are to insert the object based, at least in part, on one or more semantic contexts of the one or more other objects.

13. A machine-readable medium having stored thereon a set of instructions, which if performed by one or more processors, cause the one or more processors to use one or more neural networks to:
    identify a set of locations in an image into which to insert an object based, at least in part, on a segmentation map and a location of one or more other objects within the image;
    identify a shape of the object based, at least in part, on the set of locations; and
    insert the object into at least one of the set of locations based, at least in part, on the identified shape.

14. The machine-readable medium of claim 13, wherein the set of instructions further include instructions, which if performed by the one or more processors, cause the one or more processors to:
    use the one or more neural networks to process the segmentation map to generate a transformation corresponding to the at least one of the set of locations; and
    process the transformation using the one or more neural networks to identify the shape of the object.

15. The machine-readable medium of claim 14, wherein the segmentation map comprises labels of pixels of the image.

16. The machine-readable medium of claim 13, wherein identifying the set of locations is further based, at least in part, on a random vector.

17. The machine-readable medium of claim 13, wherein the set of instructions further include instructions, which if performed by the one or more processors, cause the one or more processors to insert the object by at least updating a representation of the image to indicate a label for the object.

18. The machine-readable medium of claim 13, wherein the one or more neural networks include a variational autoencoder (VAE).

19. One or more processors, comprising:
    circuitry to train one or more neural networks to;
        identify a set of locations in an image into which to insert an object based, at least in part, on a segmentation map and a location of one or more other objects within the image;
        identify a shape of the object based, at least in part, on the set of locations; and
        insert the object into at least one of the set of locations based, at least in part, on the identified shape.

20. The one or more processors of claim 19, wherein the circuitry is further to:
    cause the one or more neural networks to predict a transformation representing a bounding box corresponding to the at least one of the set of locations; and train the one or more neural networks based, at least in part, on the predicted transformation.

21. The one or more processors of claim 20, wherein the circuitry is further to update parameters of the one or more neural networks using one or more supervised loss functions based on the predicted transformation and ground truth data.

22. The one or more processors of claim 19, wherein the one or more neural networks include one or more discriminator models.

23. The one or more processors of claim 19, wherein the circuitry is further to train the one or more neural networks using one or more adversarial loss functions.

24. The one or more processors of claim 19, wherein the image is a training image for an autonomous driving system.

25. A method, comprising:
  training one or more neural networks to;
    identify a set of locations in an image into which to insert an object based, at least in part, on a segmentation map and a location of one or more other objects within the image;
    identify a shape of the object based, at least in part, on the set of locations; and
    insert the object into at least one of the set of locations based, at least in part, on the identified shape.

26. The method of claim 25, further comprising:
  processing the identified shape using one or more discriminators; and
  training the one or more neural networks based, at least in part, on outputs from the one or more discriminators.

27. The method of claim 26, further comprising processing the identified shape using the one or more discriminators by at least causing the one or more discriminators to classify the identified shape as real or fake.

28. The method of claim 25, further comprising training the one or more neural networks using one or more unsupervised loss functions.

29. The method of claim 25, wherein the image is part of a virtual reality environment.

30. The method of claim 25, wherein the one or more neural networks include a spatial transformer network (STN).

* * * * *